| United States Patent [19] | [11] | 4,057,563 |
|---|---|---|
| Chalkley | [45] | Nov. 8, 1977 |

[54] PREPARATION OF DYE CYANIDES

[76] Inventor: Lyman Chalkley, 6626 Tyrian St., La Jolla, Calif. 92037

[21] Appl. No.: 689,067

[22] Filed: May 24, 1976

[51] Int. Cl.$^2$ ............. C09B 11/10; C09B 11/06
[52] U.S. Cl. ............................ 260/390; 260/395; 260/391; 260/392; 260/393; 260/394
[58] Field of Search ............... 260/390, 391, 392, 393, 260/394, 395

[56] References Cited

U.S. PATENT DOCUMENTS

| 2,829,148 | 4/1958 | Chalkley | 260/391 |
| 2,829,149 | 4/1958 | Chalkley | 260/391 |
| 2,839,542 | 6/1958 | Chalkley | 260/391 |

Primary Examiner—Paul F. Shaver

[57] ABSTRACT

Cyanides of amino triarylmethane dyes are prepared by the reaction of dye bases with hydrogen cyanide. The hydrogen cyanide may be provided in gaseous or liquid form or derived from a cyanohydrin.

10 Claims, No Drawings

PREPARATION OF DYE CYANIDES

The para amino triarylacetonitriles, commonly called dye cyanides and referred to herein by this abbreviated name, have heretofore been prepared by the reaction of the related dyes with an alkali cyanide, such as sodium cyanide or potassium cyanide, in water, alcohol or other mutual solvent. An ionized cyanide salt is required for the reaction.

This classical method of preparation often proceeds at room temperature and is usually fast and efficient. Yet it has the limitations that:

a. The alkali cyanides are strongly alkaline and react with dyes to form not only the dye cyanide but a dye base which does not react readily with alkali cyanide to form dye cyanide and yet must be removed if the dye cyanide is to be used in photochemical reactions, their principal application. In some cases the separation of dye base from dye cyanide is difficult; in others so much dye is converted into base that the yield of dye cyanide is substantially reduced.

A specific illustration of this limitation is provided by the preparation of Victoria Blue B cyanide by reaction of the dye with potassium cyanide. When an aqueous solution of the dye is treated with a solution of potassium cyanide a black brown precipitate is obtained. This is extracted many times with boiling alcoholic potassium cyanide solution. Each extraction converts only a very small fraction of the initial precipitate into cyanide, which dissolves in the alcohol and is precipitated by dilution of the alcohol with water to provide many small increments of dye cyanide. These are combined to obtain enough dye cyanide to work with. (See the description of the process by the discoverers of Victoria Blue B cyanide in L. C. Joffe : "Photochemische Studien in der Triphenylmethanreihe," Dissertation, Zurich, 1921, page 39.) It is hardly a practical manufacturing process.

Another illustration of the limitation of the preparation of a dye cyanide by reaction of the dye with sodium cyanide occurs in the preparation of New Fuchsine cyanide from New Fuchsine and sodium cyanide as described in U.S. Pat. NO. 2,829,149. While the reaction is more efficient than in the case of Victoria Blue B, the initial product of reaction of dye and cyanide contains a large proportion of dye base. The discovery of an exceptionally effective means for the separation of dye cyanide from the base, as described in the patent, makes it possible to obtain pure dye cyanide with little labor; but the yield is low.

b. It is limited to the use of the true dye salt as staring product and is not practicable with dye bases, which may be more readily available.

c. The alkali cyanides are not only extremely toxic themselves but in the presence of acid evolve the still more toxic hydrogen cyanide gas. The presence of acid may occur inadvertently at any time, and is unavoidable in work with some dyes, such as Malachite Green oxalate, in which free acid is part of their crystalline structure. Thus the classical means of preparation by reaction of dye with alkali cyanide has always presented unusual health hazards and required special precautions to protect the operator.

In addition to these general limitations there are more specific ones often encountered. Some of these will appear in the following description.

Objects of the present invention are to provide a practicable method for the preparation of dye cyanides from dye bases, thus overcoming limitations (a) and (b), listed above, of the previously known method for the preparation of dye cyanides; and to provide a safer method of preparation that does not require the use of an ionized cyanide or free hydrogen cyanide, thus overcoming limitation (c) of the older method. Additional objects and advantages will become apparent from the following description of the new process.

The essential feature of the new process is the reaction of a dye base with hydrogen cyanide. It is unexpected and surprising that such a reaction should take place. The dyes in their normal salt form do not react appreciably with hydrogen cyanide, and the reaction of dye bases with cyanide salts is very slow, incomplete and impractical, as indicated in the reference above to the preparation of Victoria Blue B cyanide. Yet, I have found that the dye bases react readily with hydrogen cyanide, often rapidly and at low temperatures, to form dye cyanides.

The amino triarylmethane dyes form a group of three closely related derivatives that are referred to herein collectively as "dye bases." The members of the group are:
   The color base
   The carbinol base
   The imine base.

Color bases and carbinol bases are potentially obtainable from all of the amino triarylmethane dyes. In addition, dyes containing primary and secondary amino groups can yield imine bases. All three types of dye bases are in the same state of oxidation as the parent dye from which they are derived. This is an essential requirement for use in the new process. All three types of dye bases can be used in the process that is the subject of this patent application. A fourth dye derivative sometimes termed the "leuco base" is not in the same state of oxidation as the dye from which it is derived, does not react with hydrogen cyanide to form a dye cyanide and is excluded from the collective term "dye bases" as used in this patent application. The formulae and chemical relationships of all four types of dye derivatives are summarized on page 273 in American Chemical Society Monograph No. 127, "The Chemistry of Synthetic Dyes and Pigments" by H. A. Lubs (Reinhold Publishing Corporation, New York, 1955). Examples of suitable dye bases are those of Malachite Green, Colour Index No. 42000; Pararosaniline, Colour Index No. 42500; Rosaniline, Colour Index No. 42510; New Fuchsine, Colour Index No. 42520; Methyl Violet, Colour Index No. 42535, Crystal Violet, Colour Index No. 42555; Acid Fuchsine, Colour Index No. 42685; Methyl Green, Colour Index No. 42590; Ethyl Green, Colour Index No. 42040; Setoglaucine, Colour Index No. 42025; Victoria Blue B, Colour Index No. 44045. The process is not limited in application to these compounds and is believed to be applicable to bases of the whole range of amino triarylmethane dyes.

The reaction is carried out in a non-acidic solvent for the dye base. Since no metallic salt is employed the solvent does not have to dissolve sodium or potassium cyanide, and the elimination of this restriction of the old process is an advantage in that it greatly extends the range of solvents that can be utilized in the present process. Suitable solvents are water, liquid alcohols, liquid amids, liquid tertiary amines and other good solvents for dye bases. Because acids convert dye bases into dyes, acidic solvents, such as acetic acid, propionic acid and mono esters of polybasic acids should be avoided.

Hydrogen cyanide is added to the dye solution. The hydrogen cyanide may be added as a gas, as liquid hydrogen cyanide, or in solution in a liquid solvent. Reaction between the dye base and hydrogen cyanide begins immediately and continues usually at atmospheric pressure and at room temperature or below. It is often quite rapid.

Completion of the reaction is indicated by bleaching of the color of the imine base or color base, if such were employed, or by the failure of a small sample of reaction mixture to develop the color of the parent dye when acidified with acetic acid, which would convert any unreacted dye base into dye.

The dye cyanide that has been formed may be separated from the reaction solution by addition of a liquid in which it is little soluble, or evaporation of the solvent, or other conventional method of chemical separation.

In the new process it is not necessary to add hydrogen cyanide in its free form of liquid, gas or solution. It is already known that the formation of certain nitriles by the addition of hydrogen cyanide to suitable organic compounds is reversible under some conditions, and I have found that the dye bases are capable of extracting hydrogen cyanide from some nitriles. The largest group of nitriles that will yield hydrogen cyanide to dye bases to form dye cyanides is the cyanohydrins. In the preparation of dye cyanides from dye bases free hydrogen cyanide may be replaced by a cyanohydrin.

Cyanohydrins are alpha hydroxy nitriles. Examples of suitable ones are, acetone cyanohydrin, methylethyl ketone cyanohydrin, diethyl ketone cyanohydrin, methylpropyl ketone cyanohydrin, ethylpropyl ketone cyanohydrin, di-n-propyl ketone cyanohydrin, methyl-iso-propyl ketoncyanohydrin, methyl-butyl ketone cyanohydrin, methyl-iso-butyl ketone cyanohydrin, formaldehyde cyanohydrin, acetaldehyde cyanohydrin, proionaldehyde cyanohydrin, n-butyraldehyde cyanohydrin, iso-butyraldehyde cyanohydrin. This list is not exhaustive. Other cyanohydrins could be used. However, the commerically available acetaldehyde cyanohydrin and acetone cyanohydrin are useful and serivceable for the preparation of dye cyanides from dye bases. It is preferable to employ the ketone cyanohydrins with dye bases containing primary amino groups to avoid possible reaction of such primary amines with aldehydes freed from the aldehyde cyanohydrins.

I have found that the extraction of hydrogen cyanide from cyanohydrins by dye bases is accelerated by the presence of tertiary aliphatic amines. Examples of amines suitable for this catalytic effect are: trimethyl amine, dimethylethyl amine, methyldiethyl amine, triethyl amine, diethyl-n-propyl amine, ethyldi-n-propyl amine, tri-n-propyl amine, dimethyl-n-butyl amine, methyldi-n-butyl amine, tri-n-butyl amine, dimethyl-iso-propyl amine, methyldi-iso-propyl amine, tri-iso-propyl amine, tributyl amine, tri-iso-butyl amine, triethanol amine. Many other tertiary aliphatic amines could be used.

While the amino triarylmethane dyes are unreactive with hydrogen cyanide and cyanohydrins, they can be converted into their bases and the bases reacted with free of cyanohydrin bound hydrogen cyanide in a single solution to form dye cyanides. In this operation a tertiary aliphatic amine is added to a solution of the dye in a non-acidic solvent, whereby dye is converted into base. it is not necessary that all of the dye in solution be initially converted into its base because, as the base is removed in the subsequent conversion to dye cyanide, more base will be formed from the dye until all is consumed and changed to dye cyanide. Examples of suitable tertiary aliphatic amines have been given above. If the hydrogen cyanide for reaction with the dye base is to be provided by a cyanohydrin then the amine can serve a dual function, first to convert the dye into its base and second to accelerate the extraction of hydrogen cyanide from the cyanohydrin by the dye base in the dye cyanide formation reaction.

If the starting product is a dye, then a tertiary aliphatic amine, preferably not less than one molecule of amine per molecule of dye salt, is added to the dye solution to form the base. The addition of hydrogen cyanide or cyanohydrin converts the dye base to dye cyanide. Since the liquid cyanohydrins are often excellent solvents for dyes a convenient process is to dissolve the dye in the cyanohydrin and add the tertiary aliphatic amine, which starts the reaction by conversion of the dye into its base. The remaining amine accelerates the reaction of the dye base with the cyanohydrin.

The practice of the process will be made clearer by the following examples, which are given as illustrating but not limiting the invention. Examples that call for use of free hydrogen cyanide should be practiced with good ventilation and all other precautions necessary to protect the operator from poisoning.

EXAMPLE 1. Preparation of Victoria Blue B Cyanide

Commercial Victoria Blue B base (Colour Index Solvent Blue 4, No. 44045B) is the imine base - see Emilio Noelting and J. Saas, Berichte der deutschen chemischen Gesellschaft, volume 46, page 960 (1913). Two and one half grams of this base is dissolved at 100° C in 100 ml of dimethylformamid, the resulting solution filtered and placed in a flask equipped with a stirrer and an inlet tube, opening below the surface of the solution, through which hydrogen cyanide can be distilled into the mixture. The flask is cooled in a bath of ice and water to a solution temperature of between 5° and 10° C. The temperature is not critical and is maintained below the boiling point of hydrogen cyanide so as to assure the condensation of all of the hydrogen cyanide in the reaction mixure. As the solution is cooled below 100° a considerable portion of the dye base recrystallizes. The mixture is stirred to hold this solid in suspension. When the solution has been cooled to the temperature range given above, 1 g (an excess) of hydrogen cyanide is distilled into it, while stirring is continued. The addition of the hydrogen cyanide may be accomplished in 10 minutes or less. As the hydrogen cyanide is added the suspended dye base begins to dissolve and after it has all dissolved the strong reddish brown color of the solution fades. The reaction may be completed in half an hour, but the solution may be allowed to stand for an additional half hour after the color has faded. The solution is then mixed with 1 l of water at 15° C, whereupon the Victoria Blue B cyanide is precipitated in a highly dispersed form. To coagulate the precipitate 45 ml of saturated sodium chloride solution is added and the mixture allowed to stand for an hour. The flocculent precipitate is then collected on a filter and air dried. About 2.5 g of crude Victoria Blue B cyanide is obtained as a pale blue, easily electrified powder.

EXAMPLE 2. Preparation of New Fuchsine Cyanide

New Fuchsine (Colour Index Basic Violet 2, No. 42520) is not commerically available as the base but only as the dye. Ten grams of the dye chloride is dissolved at room temperature in 60 ml of dimethylformamide. To the solution is added 8 ml of triethyl amine. The dye is converted to base, and triethyl ammonium chloride begins to precipitate in long, slender, colorless needles. The presence of this salt does not interfere with dye cyanide formation and it is unnecessary to remove it. The solution is placed in a flask fitted with a stirrer and delivery tube as in Example 1 and cooled to between 5° and 10° C. Two grams of hydrogen cyanide is distilled into the mixture. The color fades to a reddish brown. The chrysaniline type dyes present as impurities in the commerical New Fuchsine are not bleached by hydrogen cyanide.

After standing for 8 hours the New Fuchsine cyanide is precipitated by the addition of 300 ml of water to the reaction mixture. The precipitate is collected on a funnel, washed with water and dried in a 110° C oven to a reddish brown crystalline cake of crude New Fuchsine cyanide. The yield is nearly 100% of the theoretical amount as calculated from the weight of pure dye in the commerical starting product.

EXAMPLE 3. Preparation of Crystal Violet Cyanide

Ten grams of purest commerical Crystal Violet dye (hydrated chloride)(Colour Index Basic Violet 3, No. 42555) is dissolved at room temperature in 100 ml of acetaldehyde cyanohydrin. The dye dissolves readily to a deep violet colored, stable solution. This solution is mixed at room temperature with 10 ml of triethyl amine. There is a slight rise in temperature and within five minutes a light colored precipitate begins to form. As precipitation continues the violet color of the solution fades slowly. After standing for 18 hours at room temperature the precipitate is collected on a funnel. It consists of a mixture of triethyl ammonium chloride and dye cyanide. The triethyl ammonium chloride is washed from the mixture with water, in which the salt is very soluble, and the remainder dried in a 110° oven to approximately 9 g of fluffy, pale violet colored, silken needles of Crystal Violet cyanide.

An instructive variation of the Crystal Violet cyanide preparation is to dissolve 14 g of Crystal Violet dye (hydrated chloride) in 100 ml of dimethylformamide, filter the deeply colored solution and add to the filtrate 10 ml of triethyl amine. After standing overnight at room temperature the deep violet solution is filtered from long, very thin, colorless needles of triethylammonium chloride, which, after drying, weigh 2.5 g and contain approximately 50% of the chloride ion in the dye used. The precipitation of triethylammonium chloride indicates that at least half of the dye has been converted to base even though the color has not faded substantially. Acetaldehyde cyanohydrin is added to the clear filtrate to prepare dye cyanide from the dye base. At the completion of the reaction, as indicated by fading of the violet color, the dye cyanide is precipitated by the addition of water to the reaction solution. Otherwise some of the dye cyanide would remain in solution in dimethylformamide.

EXAMPLE 4. Preparation of Methyl Green Cyanide

There are three closely related dyes, Colour Index numbers 42556, 42585 and 42590 that have been marketed under such names as Iodine Green, Methyl Green and Ethyl Green. For most purposes they and their cyanides are interchangeable and the process described here is applicable to all of them although it is specifically directed to No. 42590, which is marketed as a biological stain under the name of Methyl Green, and will be referred to here as Methyl Green. The commerical dye is of somewhat variable concentration. It contains primarily the zinc chloride double salt of an ethylated Crystal Violet but also some violet dye and small amounts of a more highy ethylated orange dye. In the following process the dye is separated from most of the zinc, converted into the dye base and reacted with hydrogen cyanide supplied by acetone cyanohydrin until the base has been converted to dye cyanide, which is salted out of solution.

Eight and a half grams of Methyl Green is dissolved at 60° C in 100 ml of water and the solution filtered from any traces of insoluble material, which is discarded. To the filtrate is added at room temperature 5 ml of triethyl amine. The mixture is shaken until the amine has dissolved and let stand for 24 hours at room temperature. It is then filtered from the precipitated zinc hydroxide.

To the filtrate is added at room temperature 10 ml of acetone cyanohydrin, the mixture shaken to form a homogeneous solution and allowed to stand in the dark at room temperature for three days, when the color should have faced to a degraded yellow and a 1 ml sample diluted to 50 ml with 1% aqueous acetic acid produces not strong green color after 6 hours in the dark at room temperature. If the reaction mixture does not meet these tests for complete reaction of the dye base it is allowed to stand until it does.

At the completion of the reaction the dye cyanide is precipitated by addition to the reaction mixture of one-half of its volume of saturated sodium chloride solution. The precipitated dye cyanide is collected on a filter, washed with a mixture of 1 volume of saturated salt solution diluted to 2 volumes with water, sucked as dry as possible on the filter and air dried. The product is Methyl Green cyanide in the form of its quaternary ammonium chloride salt.

EXAMPLE 5. Preparation of Acid Fuchsine Cyanide

Commercial Acid Fuchsine (Colour Index Acid Violet 19, No. 42685) is a mixture of sulfonated Rosaniline type dyes, which are quite soluble in water, as are their cyanides. Therefore, if it is deired to retain the original dye mixture in the mixture of cyanides derived from it a preparative method is needed that will effect complete conversion of dye to cyanide and require as little as possible separation of components to arrive at a final dye cyanide product that is as free of dye as may be required for the use to which it is to be put.

Ten grams of commercial Acid Fuchsine, which should contain about 60% of dye, is dissolved in 100 ml of methanol and 10 ml of triethyl amine is added. The color fades as the dye base is formed. The solution is filtered from any insoluble inorganic salts present in the dye. Two grams of hydrogen cyanide is distilled into the solution, which is placed in a sealed bottle and allowed to stand in the dark at room temperature until a small sample diluted and acidified with 5% aqueous acetic acid does not develop a red color. A number of days may be required for complete reaction. Evaporation of the methanol, triethyl amine an excess hydrogen cyanide yields solid dye cyanide.

I claim:

1. The process of preparation of an amino triarylmethane dye cyanide by reaction of an amino triarylmethane dye base with hydrogen cyanide in absence of additional acid.

2. The process of claim 1 in which the amino triarylmethane dye base is chosen from the group consisting of color base, imine base and carbinol base.

3. The process of claim 1 in which the amino triarylmethane dye base is the color base.

4. The process of claim 1 in which the amino triarylmethane dye base is the imine base.

5. The process of claim 1 in which the amino triarylmethane dye base is the carbinol base.

6. The process of claim 1 in which the hydrogen cyanide is derived from a cyanohydrin insolution with the amino triarylmethane dye base.

7. The process of claim 1 in which the hydrogen cyanide is derived from a mixture of cyanohydrin and a tertiary aliphatic amine in solution with the amino triarylmethane dye base.

8. The process of preparation of an amino triarylmethane dye cyanide consisting in the steps of conversion of an amino triarylmethane dye into a dye base by admixture in a non-acidic solvent with a tertiary aliphatic amine followed by reaction of said dye base with hydrogen cyanide in absence of additional acid.

9. The process of claim 8 in which the hydrogen cyanide is derived from a cyanohydrin in solution with the dye base.

10. The process of claim 8 in which the hydrogen cyanide is derived from a cyanohydrin in solution with the dye base and tertiary aliphatic amine.

* * * * *

UNITED STATES PATENT OFFICE
CERTIFICATE OF CORRECTION

Patent No. 4,057,563            Dated November 8, 1977

Inventor(s) Lyman Chalkley

It is certified that error appears in the above-identified patent and that said Letters Patent are hereby corrected as shown below:

Column 1, line 54, "staring" should read --starting--.
Column 3, line 41, "ketoncyanohydrin" should read --ketone cyanohydrin--.
Column 4, line 1, "of" should read --or--.
Column 6, line 32, "faced" should read --faded--.
Column 6, line 34, "not" should read --no--.
Column 6, line 52, "deired" should read --desired--.
Column 7, line 2, "an" should read --and--.
Claim 6, line 2, "insolution" should read --in solution--.

*Signed and Sealed this*

*Twenty-eighth* Day of *February 1978*

[SEAL]

Attest:

RUTH C. MASON
*Attesting Officer*

LUTRELLE F. PARKER
*Acting Commissioner of Patents and Trademarks*